Patented Mar. 6, 1923.

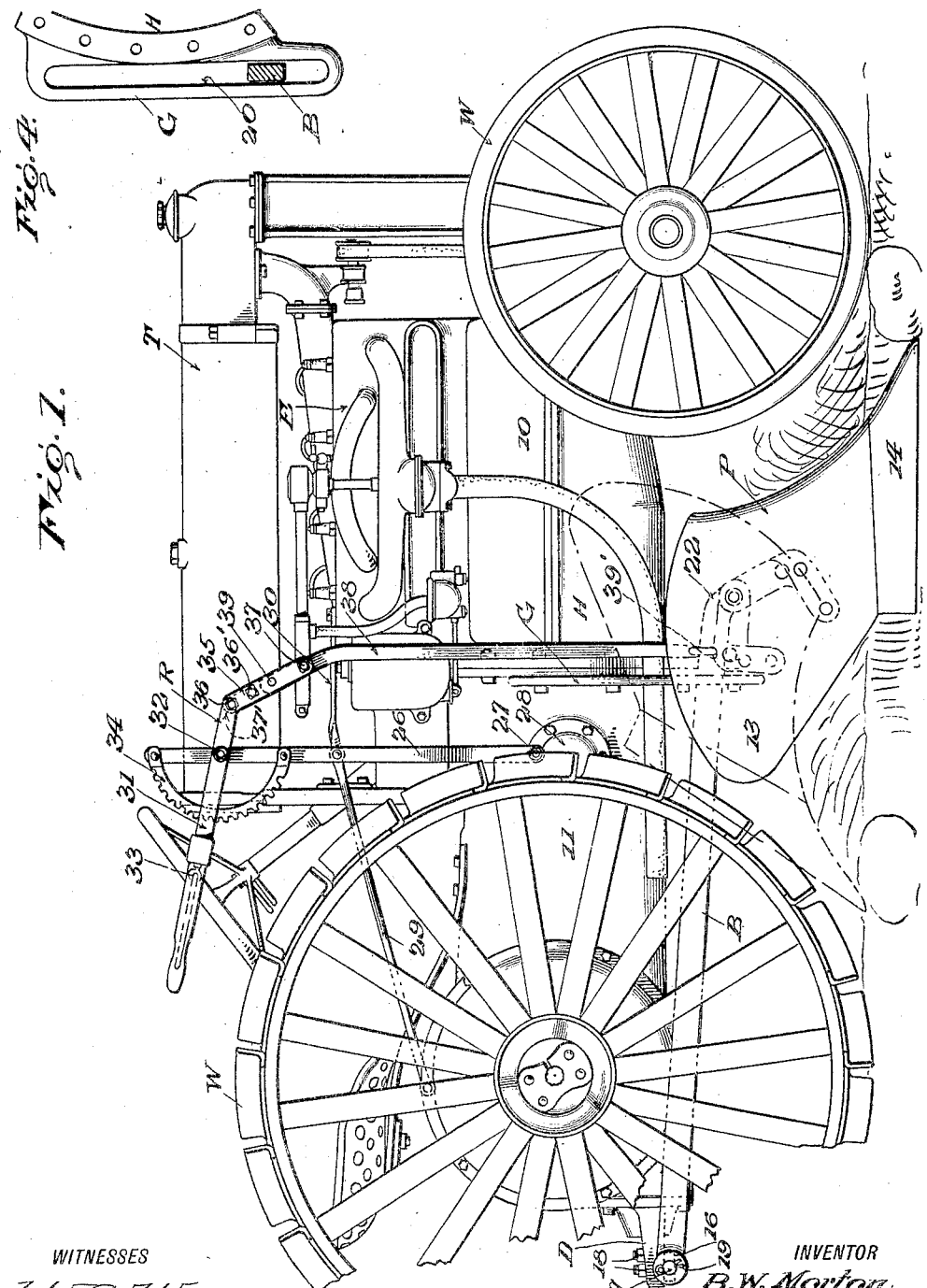

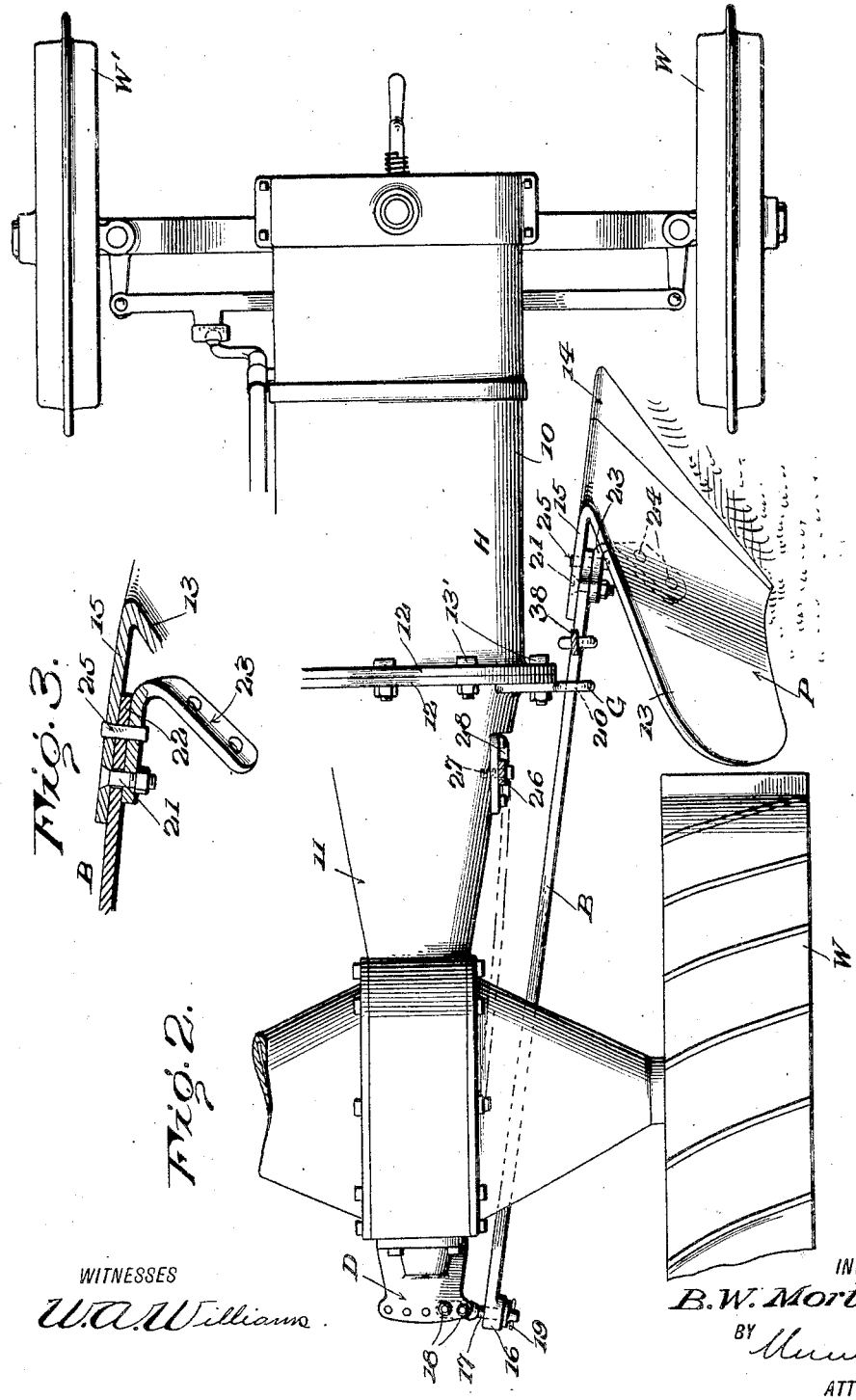

1,447,221

UNITED STATES PATENT OFFICE.

BENJAMIN W. MORTON, OF WILLISTON, FLORIDA.

PLOW ATTACHMENT FOR TRACTORS.

Application filed February 25, 1922. Serial No. 539,253.

*To all whom it may concern:*

Be it known that I, BENJAMIN W. MORTON, a citizen of the United States, and a resident of Williston, in the county of Levy and State of Florida, have invented certain new and useful Improvements in Plow Attachments for Tractors, of which the following is a specification.

This invention relates to a plow attachment for tractors.

The object of the invention is to provide means whereby a plow of the landside type may be directly attached to a tractor for operating in a highly efficient manner.

A further object of the invention is that the plow be disposed so that it may be observed by the driver of the tractor during the use thereof.

A still further and important object of the invention is that means be provided to eliminate the possibility of breakage in case the plow should meet with a well anchored obstruction.

Another object of the invention is that means be provided to accurately regulate the depth which the plow is permitted to penetrate during the operation thereof.

Other objects and objects relating to details of construction, combination and arrangement of parts will hereinafter appear in the detailed description to follow.

The invention is illustrated by way of example in the accompanying drawings, in which:—

Figure 1 is a view in side elevation of a tractor showing the application of the present invention, Figure 2 is a partial top plan view of the same, Figure 3 is a detailed sectional view illustrating the manner in which the plow is secured to the push bar, Figure 4 is a detailed view of the push bar guide.

Referring to the drawings more particularly, T indicates generally a tractor, of which W represents the rear or drive wheels, W' the front wheels, E the associated engine, D the draw bar coupling or hitch, and H the casting or housing of the driving mechanism for the tractor. The housing in this instance consists in the two sections 10 and 11, each section being formed with a suitable flange 12, and said flanges being bolted together by bolts 13.

In carrying out the present invention there is provided a plow generally indicated by the reference P, a push bar B, a guide member G, and a ratchet bar raising and lowering mechanism for the plow P generally indicated by reference character R.

The plow P comprises a mold-board 13 which is preferably curved as shown. The mold-board is substantially dished or curved similar to the mold bar of a plow-coulter. The mold-board 13 is shaped so that a point 14 may be readily secured thereto. The forward end of the mold-board terminates in a rearwardly extending portion or member 15.

The push bar B comprises an elongated member, as shown, terminating at its rear end in an enlarged head 16 through which there is extended the bolt 17, said bolt terminating at its inner end in a flattened portion by which the same may be secured to the hitch D through the bolts 18. The bar B is held from displacement from the bolt 17 by the means of a cotter pin 19.

The guide G preferably comprises a plate-like member and has its inner edge formed so that the same may be fitted against the housing H of the tractor. Adjacent this edge there is provided suitable openings through which flange bolts 13' may be extended for securing the guide member in position. The guide member is also provided with an elongated slot 20 which is closed at each of its ends, as shown, and through which the push bar B extends. The forward end of the push bar is pivoted to the extension 15 of the plow P by a bolt 21, said bolt being adapted to easily turn with relation to the bar B. The bolt 21 is positioned slightly at the rear of the forward end of the bar B, as best shown in Figure 3, and from the bolt 21 the bar B is formed with a downwardly extending portion 22 as shown at Figure 1. Between the mold-board 13 and push bar there is extended a brace member 23 which is secured to the mold-board 13 by rivets or the like as indicated at 24 and which is secured to the bar B by the bolt 21. To normally hold the plow in operative position a frangible pin 25 is extended through the plow extension 15, bar B and brace 23. The pin 25 is preferably of wood and of such strength that it would break and permit the plow P to turn upon the bolt 21 as a pivot, in case the plow P should meet with a solid obstruction and thus eliminate any possibility of breakage of the plow or other parts of the attachment.

The ratchet and bar lifting mechanism R comprises a standard 26 which has its lower end secured by a flange bolt 27, said flange bolt normally serving to secure the cover 28 upon the housing of the tractor. The cover 28 in this particular type of tractor closes an opening in the housing of the tractor through which the shaft of a power pulley is extended when it is desired to use the power unit of the tractor for other services than driving the tractor. The standard 26 may also be supported by rods 29 and 30, and adjacent the upper end of the standards there is pivoted a ratchet bar 31 as at 32. The ratchet bar carries a suitable pawl and lever mechanism generally indicated by the reference numeral 33, and the pawl is adapted to engage with the ratchet segment 34 whereby the forward end of the lever may be moved to different positions and so held.

The forward end of the lever bar 31 is provided with a downwardly extending portion 35. A strap 37' which substantially agrees in length with the downwardly bent lever portion 35 is secured to said portion by the bolts 36 and 36' and this strap should be so arranged that the lower end portion thereof is in spaced relation with the bar portion 35. Between the lower end of the strap 37' and bar portion 35 there is extended the upper end portion of a bar 38 and this bar is pivotally connected to the strap 37' and bar portion 35 by the means of a bolt 37. The upper end of the bar 38 is further connected to the strap member 37' and bar portion 35 by a frangible element 39 which is preferably in the form of a wooden pin. As is obvious by this arrangement upon a high pressure being exerted upwardly by the bar 38 the pin 39 will break and permit the bar 38 and lever bar 31 to pivot about the bolt 37.

It is believed from the foregoing description and the accompanying drawings that it may be readily seen that the present plow attachment may be easily attached to a tractor. The plow P may be raised a suitable distance by the ratchet bar lever 31 so that the same may be carried from place to place by the tractor. Also as is obvious the tractor may be used for other purposes while carrying the plow. When it is desired to operate the plow the same is lowered as illustrated in Figure 1. As the tractor advances the plow will penetrate the depth adjusted and efficiently turn the soil. In case an obstruction is met which is substantially anchored the pin 25 would break and permit the plow to turn upon the bolt 21 as a pivot and to assume the dotted line position shown in Figure 1. Even though the tractor was not immediately stopped no harm would result.

The operator may lift the push bar B through the ratchet lever 31, reposition the plow P and replace the pin 25.

It is particularly to be mentioned that by positioning the plow P with the bar B the same will at all times penetrate the maximum depth permitted by the ratchet lever 31. It is further important to state that it has been found during the use of the present invention that no preceptible lateral stress is exerted upon the bar B at its forward end. The bar B, in other words, is free to move upwardly and downwardly within the guide member G and the stress is withstood by the hitch D of the tractor. It also may be here pointed out that during the operation of the plow any weeds or other débris passing over the mold board P will be drawn downwardly by the associated drive wheel W. The drive wheel will pass over the weeds and thus break them and pack them so that they will not interfere with the plow upon cutting its next furrow.

While I have shown my invention associated with a particular type of tractor it is to be understood that I am aware of the fact that the same may be utilized with equal advantages on other types of tractors as indicated by the appended claims.

I claim:—

1. In an apparatus of the character described, a push bar, a mold board plow, a pivot connection between the free end of the push bar and landside of said mold board plow adapted to permit free turning movement of said plow, and a frangible connection between said landside and push bar adapted to normally hold the plow rigidly with respect to the push bar and also to break and permit free turning movement of the plow upon the same being subjected to a predetermined shock in the operation thereof.

2. In an apparatus of the character described, a push bar, a mold board plow, a pivot connection between the free end of said push bar and the landside of said plow, a downwardly extending projection at the forward end of the push bar, and a frangible connection between said extension and the landside of said plow.

3. In an apparatus of the character described, a push bar, a mold board plow, a pivot connection between the free end of said push bar and the landside of said plow, a downwardly extending projection at the forward end of the push bar, a frangible connection between said extension and the landside of said plow, and a brace extending between the mold board and landside, said brace being pivotally connected to the pivot connection between said landside and the push bar.

BENJAMIN W. MORTON.